UNITED STATES PATENT OFFICE 2,089,569

ADDITION PRODUCTS OF GLYCIDE TO ORGANIC COMPOUNDS

Ludwig Orthner and Claus Heuck, Leverkusen-I. G.-Werk, Germany, assignors to General Aniline Works, Inc., New York, N. Y., a corporation of Delaware No Drawing. Application February 23, 1933, Serial No. 658,266. In Germany March 2, 1932

14 Claims. (Cl. 260—106)

The present invention relates to new addition products of glycide with organic compounds containing one or several hydroxy- and/or amino and/or carboxylic- and/or carboxylic acid amide- and/or sulfonic acid amide groups, which still possess a free hydrogen atom capable of reacting more than one molecular proportion of glycide having reacted per each reactive hydrogen atom of the organic compound. The resulting products may further be etherified or acylated. The new compounds are colorless or weakly brownish colored wax-like or oily substances and most probably correspond to the following types:

(1) $R-O-CH_2-CHOH-CH_2-$
$\qquad O-CH_2-CHOH-CH_2-OR_1$
(2) $R-COO-CH_2-CHOH-CH_2-$
$\qquad O-CH_2-CHOH-CH_2-OR_1$
(3) $R-SO_2-NH-CH_2-CHOH-CH_2-$
$\qquad O-CH_2-CHOH-CH_2-OR_1$
(4) $R-CONH-CH_2-CHOH-CH_2-$
$\qquad O-CH_2-CHOH-CH_2-OR_1$
(5) $RNH-CH_2-CHOH-CH_2-O-$
$\qquad CH_2-CHOH-CH_2-OR_1$ wherein R means alkyl, aralkyl, cycloalkyl or aryl, $R_1$ stands for H and may be an ethereal or an acyl residue. The addition of the glycide to such compounds as above given is performed in the usual manner by reacting glycide upon the organic substances and the reaction may strongly be accelerated by heating the mixture, in which case, if desired, the reaction may be carried out in a pressure apparatus. Substances are obtained which, on account of the presence of an increased number of hydrophilic groups, are much more easily soluble in water, or more easily distributed than the starting materials.

Furthermore the use of catalysts is suitable. Such catalysts are, for instance, the hydroxides of the alkali metals or alkaline earth metals, alkaline reacting salts, organic acids or acid reacting salts. As this addition represents an exothermic process the gradual addition in small amounts of the glycide to the reaction mixture and the application of solvents or diluents are often profitable. The quantity of the glycide depends on the desired properties of the final product. It is advantageous to use a relatively large quantity of glycide, if the starting products are difficultly soluble in water in order to obtain a product which is soluble or capable of being distributed in water. By suitably determining the amount of the glycide the starting materials can also incompletely be converted. The mixtures thus obtained can profitably be used for many purposes.

As starting materials for this process mono- or polyvalent hydroxy compounds and their substitution products may be used, for instance, butyl alcohol, dodecyl alcohol, octadecyl alcohol and oleyl alcohol, castor oil, glycerine, sorbit, starch, phenol, cresol, xylenol, naphthol, dihydroxyphenols, the esters of salicylic acid etc. Furthermore, one may use mono- and polyvalent aliphatic and aromatic amines, for instance, butylamine, octadecylamine, benzylamine, hexahydroaniline, dibutylamine, cyclohexylethylaniline, dicyclohexylaniline, piperidine, morpholine, diethanolamine, diethylene diamine, aniline, its homologous and substitution products, diphenylamine, amino-phenols, amino-alcohols, naphthylamine, arylene diamine, naphthylene diamine ethylaniline etc.

The reaction can also be performed with the aid of mono- and polyvalent carboxylic acids such as butyric acid, lauric acid, palmitic acid, oleic acid, linoleic acid, coconut oil fatty acid, ricinoleic acid, lactic acid, maleic acid, tartaric acid, adipic acid, oleylglycocol, stearylsarcosine, benzoic acid, phenylacetic acid, anthranilic acid etc.

As starting materials there can likewise be applied amides of carboxylic acids and organic sulfonic acids, if their amino groups contain replaceable hydrogen atoms and/or if the nitrogen substituents contain hydroxy groups. As examples of such compounds there are mentioned butyric acid ethyl amide, the hydroxyethylamide of lactic acid, the oleyl amide, the hydroxyethylamide of palmitic acid, the anilide of linoleic acid, the dihydroxypropylamide of ricinoleic acid, the butyl amide of benzoic acid, the naphthyl amide of salicylic acid, the phthalimide, the phthalamic acid, the cyclohexylamide of toluylene sulfonic acid, the amide obtainable from 1 mol. of lauric acid and 1 mol. of ethylene diamine and still containing a free amino group etc.

Of course, also mixtures of the aforementioned substances can be converted. The conversion can preferably be carried out in such a manner that instead of glycide there is brought to reaction an equimolecular quantity of monochlorohydrine and lye in such a manner that the mono-chloro-hydrine is mixed with the organic components and the caustic soda lye is added thereto, while stirring. Thus the glycide is formed in the reaction mixture itself according to the following scheme:

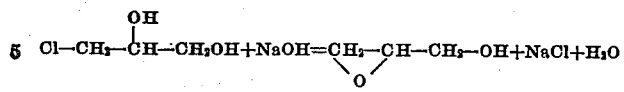

The physical properties of the compounds thus obtained can be varied and improved within wide limits, if the hydroxy groups still contained therein are converted with other compounds. We mention, for instance, inorganic or organic acids and their derivatives such as acid chlorides and acid anhydrides. If these reaction products possess an acid character, they can also be applied in the form of their salts with inorganic or organic bases. In some appropriate cases the hydroxy groups can also be converted with organic sulfonic acids possessing groups capable of reacting, for instance, with the aid of chloro-ethane-sulfonic acid, benzylchloride - sulfonic acid, ethionic acid etc. Furthermore, conversions can be performed with alkylene oxides or epichlorohydrine.

The compounds thus produced may be used as such, or mixed together, or mixed with other substances such as soaps, Turkey red oil, sulfonates of mineral oil and fatty alcohols, alkylated naphthalene sulfonic acids, glue, gelatine and other albuminous substances, for instance, lysalbinic acid, sulfite liquor, varieties of gum, being soluble in water, mucilage, alcohols, glycols, phenols, ketones, hydrocarbons or halogenated hydrocarbons respectively, and so on or with mixtures of these substances. The compounds obtained in this manner are important as emulsifying, purifying, wetting, dispersing, impregnating and softening agents in the textile-, leather-, caoutchouc-, lacquer- and paper industries as solvents and as agents for preparing pastes and as protective colloids in the dye works and furthermore in the cosmetic and pharmaceutical industries for manufacturing salves and creams.

The following examples will illustrate our invention but without limiting it thereto. The parts are by weight:

*Example 1.*—74 parts of isobutyl alcohol and 1 part of a 33% caustic soda lye are heated at the reflux condenser to gentle boiling in a stirring vessel. 148 parts of glycide are slowly dropped into the reaction mixture. A viscous, weakly yellow colored oil, being clearly soluble in water, is obtained. When 148 parts of glycide are introduced once more into the reaction mixture in the same manner a more highly viscous product is obtained. The products obtained in this way are especially suitable as additions to mercerizing lyes in order to raise their wetting capacity.

*Example 2.*—75 parts of glycide are dropped, while constantly stirring, into 68 parts of undecylamine with the addition of a little water at a temperature of about 60 to 80° C. After some time the amine has become easily soluble in water. The aqueous solutions foam strongly and are resistant to acid, lime and very resistant to alkali. In a bath of hard water of a temperature of 20° C., which contains a solution of 1 g. of this product per liter, the cleaning effect for wool is excellent.

*Example 3.*—10 parts of linseed oil fatty acid are heated in a pressure vessel with 12–14 parts of glycide for several hours at a temperature of about 60 to 100° C. The reaction product, an oily substance, has the acid number 5.6. It easily dissolves in fatty oils and organic solvents such as, for instance, benzine. The substance dissolves in water in form of a thinly liquid stable emulsion.

In the presence of this product linseed oil can be emulsified with Turkey red oil essentially more easily than without this addition.

When a higher molecular fatty acid is converted with less glycide, there are obtained products being insoluble in water. In a simple manner they can be converted into clearly soluble compounds resistant to lime by eventually treating in the absence of solvents with agents showing a sulfonating action such as chlorosulfonic acid.

*Example 4.*—75 parts of glycide are slowly dropped into 25 parts of coconut oil fatty acid hydroxyethylamide and 0.5 part of a 33% caustic soda at the reflux condenser at a temperature of about 140 to 150° C. The mixture is stirred for two more hours at a temperature of 150° C. until the condensation is complete. After cooling a viscous sirup is obtained which easily and clearly dissolves in water. The aqueous solution foams strongly and possesses a good wetting and dispersing effect.

*Example 5.*—160 parts of caustic soda dissolved in 160 parts of water are slowly introduced, while well stirring, into a mixture of 186 parts of aniline and 444 parts of mono-chloro-hydrine at a temperature of about 90 to 100° C. After heating the reaction mixture for 2 hours to a temperature of 100° C. the separated common salt is filtered off and the filtrate is set free from water by distillation in vacuo. The product thus obtained is excellently suitable as addition agent in the printing of dyestuffs on textile fabrics.

We claim:

1. Addition products of glycide and of another organic compound containing a radical bearing reactive hydrogen selected from the group consisting of hydroxy, amino, carboxylic, carboxylic acid amide, and sulfonic acid amide radicals, each reactive hydrogen atom of the organic compound being replaced by a polyglycerine radical, said products being colorless or weakly colored wax-like or oily substances, and being auxiliary products for the textile industry.

2. Addition products in accordance with claim 1, in which the free hydroxy groups of the polyglycerine component have been reacted with a substance capable of raising the hydrotropical properties of the products and being selected from the group consisting of aclyating and etherifying agents.

3. An addition product of glycide and of another organic compound containing hydroxyl groups, each reactive hydrogen atom of the organic compound being replaced by a polyglycerine radical, said product being a colorless or weakly colored wax-like or oily substance, and being an auxiliary product for the textile industry.

4. An addition product of glycide and of an organic compound containing a carboxylic acid radical, each reactive hydrogen atom of the organic compound being replaced by a polyglycerine radical, said product being a colorless or weakly colored wax-like or oily substance, and being an auxiliary product for the textile industry.

5. An addition product of glycide and of an organic compound containing an amino group, each reactive hydrogen atom of the organic compound being replaced by a polyglycerine radical, said product being a colorless or weakly colored wax-like or oily substance, and being an auxiliary product for the textile industry.

6. An addition product of glycide and of an amine, each reactive hydrogen atom of the amine being replaced by a polyglycerine radical, said product being a colorless or weakly colored wax-like or oily substance, and being an auxiliary product for the textile industry.

7. An addition product of glycide and of an aliphatic amine, each reactive hydrogen atom of the amine being replaced by a polyglycerine radical, said product being a colorless or weakly colored wax-like or oily substance, and being an auxiliary product for the textile industry.

8. An addition product of glycide and of an amine containing an aliphatic chain of more than 10 carbon atoms, each reactive hydrogen atom of the amine being replaced by a poly-glycerine radical, said product being a colorless or weakly colored wax-like or oily substance, and being an auxiliary product for the textile industry.

9. An addition product of glycide and of a long chain fatty alcohol, each reactive hydrogen atom of the alcohol being replaced by a polyglycerine radical, said product being a colorless or weakly colored wax-like or oily substance, and being an auxiliary product for the textile industry.

10. An addition product of glycide and of an aliphatic alcohol containing at least 12 carbon atoms, each reactive hydrogen atom of the alcohol being replaced by a polyglycerine radical, said product being a colorless or weakly colored wax-like or oily substance, and being an auxiliary product for the textile industry.

11. An addition product of glycide and oleyl alcohol in which only the hydrogen atom of the hydroxy group of the oleyl alcohol is replaced by a polyglycerine radical.

12. An addition product of glycide and of a long chain fatty acid, each reactive hydrogen atom of the acid being replaced by a polyglycerine radical, said product being a colorless or weakly colored wax-like or oily substance, and being an auxiliary product for the textile industry.

13. An addition product of glycide and of an unsaturated fatty acid, each reactive hydrogen atom of the acid being replaced by a polyglycerine radical.

14. An addition product of glycide and of oleic acid, the reactive hydrogen atom of the acid being replaced by a polyglycerine radical.

LUDWIG ORTHNER.
CLAUS HEUCK.